UNITED STATES PATENT OFFICE 2,623,053

OXIDATION OF STEROIDAL SAPOGENINS

John B. Rust, Verona, N. J., assignor, by direct and mesne assignments, of one-half to Montclair Research Corporation, Montclair, N. J., a corporation of New Jersey, and one-half to Ellis-Foster Company, a corporation of New Jersey No Drawing. Application December 16, 1950,
Serial No. 201,246

2 Claims. (Cl. 260—397.4)

The present invention relates to a process of degrading sapogenins, or more specifically the spiroketal side chain of sapogenins to $\Delta^{16}$-pregnenolone derivatives.

It is an object of this invention to provide a rapid and simple method of converting the steroidal sapogenins into pregnene and pregnadiene derivatives. It is another object of this invention to convert steroidal sapogenins into useful steroidal pregnene and pregnadiene derivatives which may be utilized as such, or which may be further converted into steroidal hormonal compounds.

Further objects of this invention will become apparent from the more detailed description given hereinafter. Such detailed description should not be construed as limiting the invention in any way, but only by way of illustration.

The present invention comprises reacting the acetate of a steroidal sapogenin such as diosgenin acetate with polyphosphoric acid by heating in a suitable solvent such as glacial acetic acid and thereafter oxidizing the phosphorus-containing reaction product to yield a pregnadienolone derivative.

As the steroidal sapogenin of the present invention, I may employ diosgenin acetate, sarsasapogenin acetate, tigogenin acetate, chlorogenin diacetate, gitogenin diacetate, digitogenin diacetate, yuccagenin diacetate, lilogenin diacetate, manogenin diacetate, mexogenin diacetate, hecogenin acetate, rockogenin diacetate, furcogenin acetate, and the like.

The polyphosphoric acids used in the present invention may be purchased as a commercial product or may be made by the reaction of POCl₃ with water as shown in the following reactions:

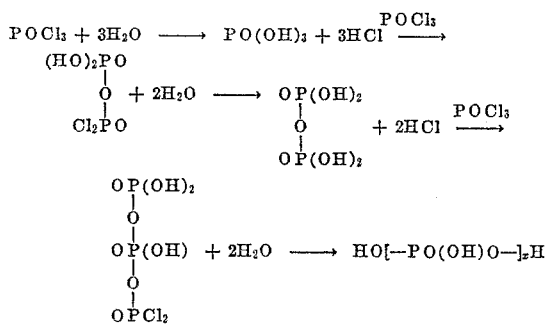

On the other hand, the polyphosphoric acid may be made by reaction of P₂O₅ with water or with orthophosphoric acid. In all cases the polyphosphoric acid may be represented by the formula:

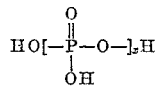

The most suitable solvent for carrying out the reaction of the present invention is glacial acetic acid since it is a solvent for the polyphosphoric acids as well as the sapogenin acetates and the reaction product. Furthermore, the oxidation reaction may be carried out in the same solvent without isolating the intermediate reaction product.

As oxidizing agent in the process of the present invention, I may employ chromium trioxide, potassium permanganate, ozone and the like.

In the reaction of the present invention with polyphosphoric acid and also in the subsequent oxidation, it is not essential that the $\Delta^5$ bond be protected if one is present, although it may be protected if desired by addition of bromine.

It may be seen that it is not necessary to isolate the intermediate phosphorus-containing reaction product prior to oxidation. However, isolation may be effected if it is so desired.

The following example will serve to better illustrate the present invention, but is not intended to limit the scope thereof in any way.

*Example.*—A solution of polyphosphoric acid in glacial acetic acid was made as follows: 10 gms. of 85% orthophosphoric acid were dissolved in 80 gms. of glacial acetic acid and refluxed with 10 gms. of acetic anhydride to form an 8.5% solution of anhydrous orthophosphoric acid in glacial acetic acid. 14 gms. of phosphorus pentoxide were added and the mixture stirred and heated until the phosphorus pentoxide had reacted and the polyphosphoric acid had dissolved.

At this point 10 gms. of diosgenin acetate were added and the solution heated to boiling under a reflux condenser for 1 hour. In this time the solution turned a very dark brown-green. It was cooled to 25° C. and 5 gms. of chromium trioxide dissolved in 50 ml. of 60% acetic acid were added slowly with agitation, maintaining the temperature at 25°–27° C. The mixture was maintained at 25°–27° C. for 1½ hours, then a small portion of ethanol was carefully added and the solution diluted with water. It was thoroughly extracted with ether and the combined ether extracts washed with water, with dilute sodium carbonate and finally with water. Methanol was added to the ether and the ether distilled off. Potassium carbonate dissolved in water was added and the solution refluxed for 45 minutes. It was diluted with water and extracted with ether with the addition of a small amount of acetone to facilitate solution. The ether was washed with water, dried and distilled. The residue was crystallized from methanol several times to give a compound having a melting point of 210°–212° C., which did not depress the melting point of an authentic sample of $\Delta^{5,16}$-pregnadiene-$3(\beta)$ol-20-one M. P.=212°–214° C.

I claim:

1. The process of making $\Delta^{5,16}$-pregnadiene-$3(\beta)$ol-20-one, comprising reacting diosgenin acetate with a polyphosphoric acid in acetic acid by heating, oxidizing said reaction product, then hydrolyzing with an alkali carbonate to said pregnadieneolone and isolating same.

2. The process of making $\Delta^{16}$-pregnenolone derivatives, comprising reacting a steroidal sapogenin acetate with a polyphosphoric acid in acetic acid by heating, oxidizing said reaction product, then hydrolyzng to a $\Delta^{16}$-pregnenolone compound and isolating same.

JOHN B. RUST.

REFERENCES CITED

The following references are of record in the file of this patent:

UNITED STATES PATENTS

| Number | Name | Date |
|---|---|---|
| 2,352,848 | Marker | July 4, 1944 |